3,195,101
INTEGRATED SONAR SYSTEM

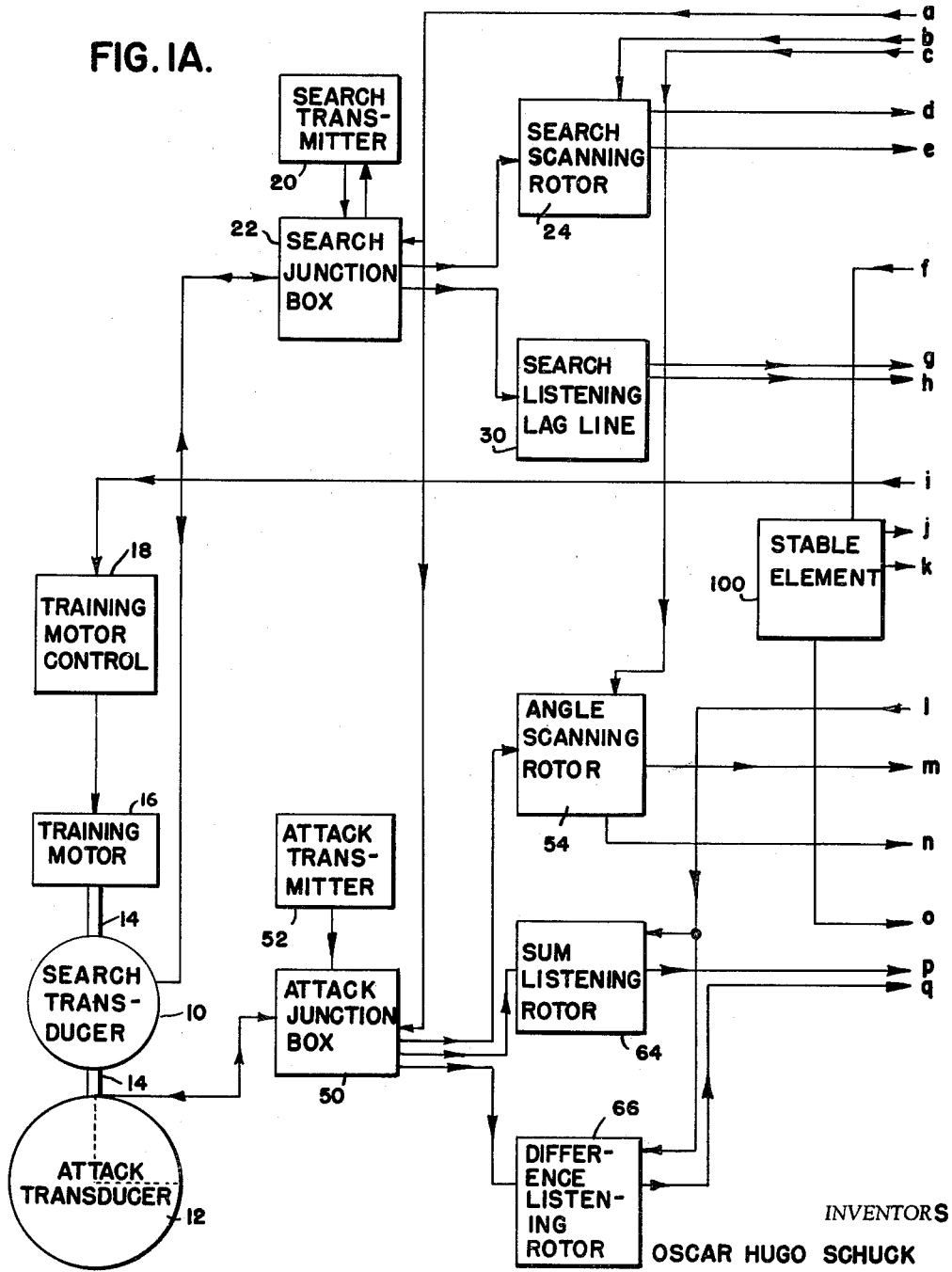

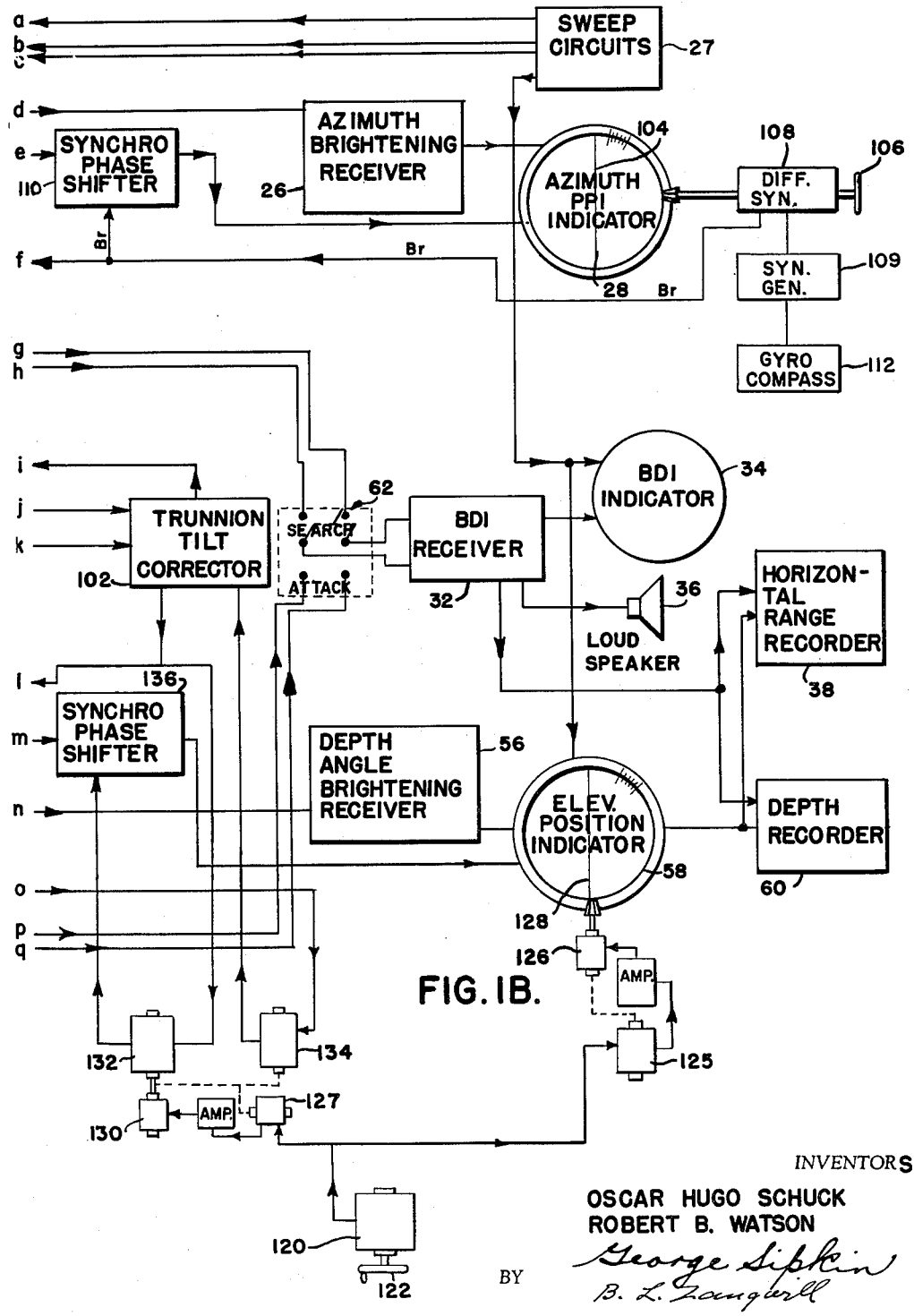

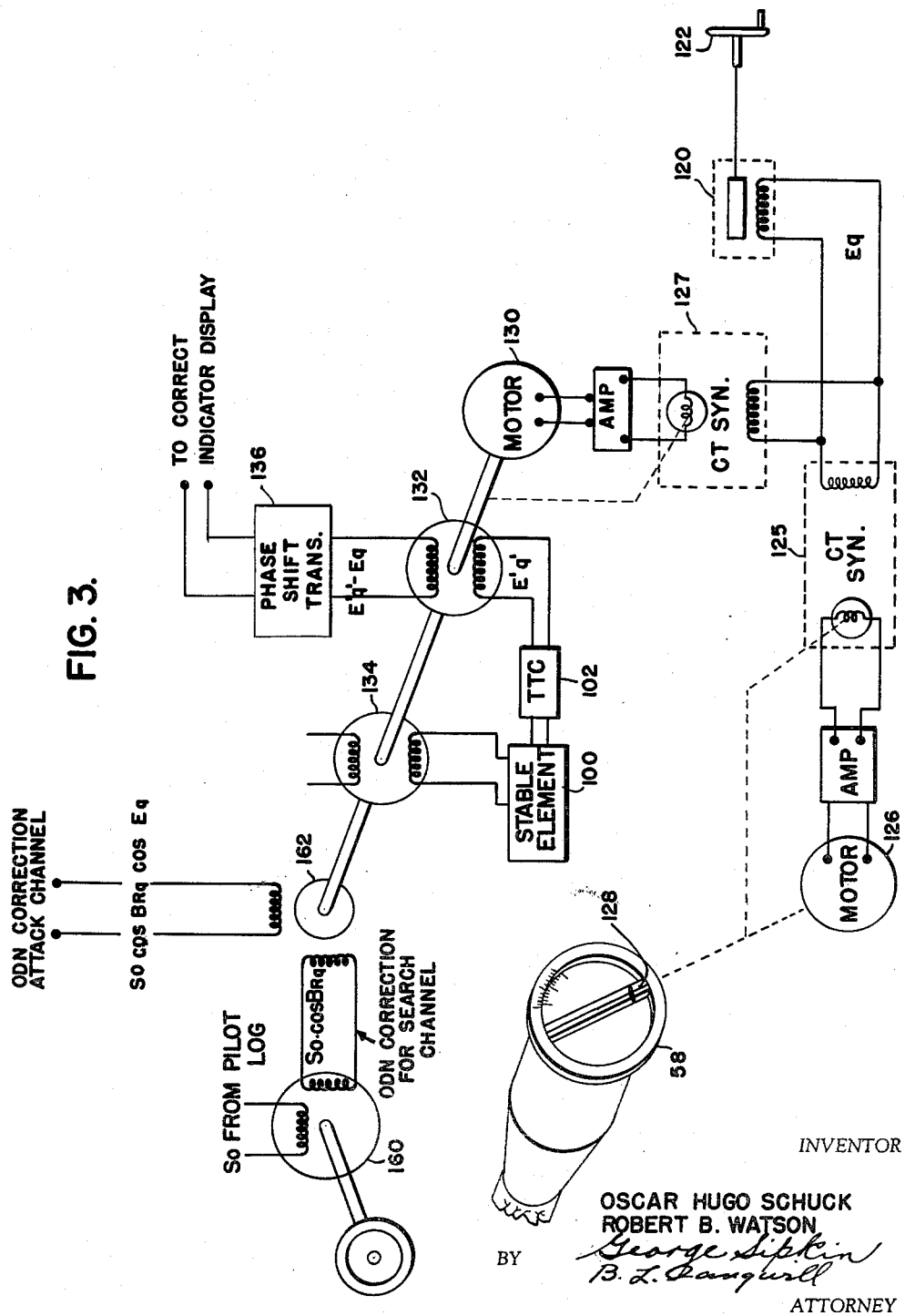

Oscar Hugo Schuck, Minneapolis, Minn., and Robert B. Watson, Austin, Tex., assignors to the United States of America as represented by the Secretary of the Navy
Filed Oct. 29, 1952, Ser. No. 317,382
10 Claims. (Cl. 340—3)

This invention relates to underwater sound echo ranging systems and more particularly is directed to an integrated sonar system which is capable of furnishing information concerning the position of a target in space.

Most sound echo ranging systems which have been used up to the present time have incorporated apparatus which gives target bearing and range in an essentially azimuthal plane only. With the advent of advanced fire control techniques and improved underwater ordnance, a system which will provide further and more accurate detailed information as to the location of a target and its motion through the water is necessary. To take full advantage of the improved fire control and ordnance, the sound system should measure, for example, azimuth bearing to $\pm\frac{1}{2}$ a degree at maximum range, depth angle to $\pm\frac{1}{2}$ degree at 1,000 yards and target range to $\pm10$ yards at 1,000 yards.

It is the primary object of the present invention to provide a system which will fulfill these specifications as closely as possible in the light of present knowledge.

Another object of the invention is to provide a system in which information suitably corrected for the motions of the carrying ship is audibly and visually presented to the operators.

Other objects and advantages of the invention will become apparent from the following description of a specific embodiment thereof taken in connection with the attached drawings, in which:

FIGS. 1A and 1B, when joined together with the lines $a$ through $q$ matching, form a single line block diagram of the electronic portion of a system embodying the present invention;

FIG. 3 is a diagrammatic illustration of control features utilized in the invention, and includes apparatus used to nullify their "own Doppler" effect.

Figure 2:
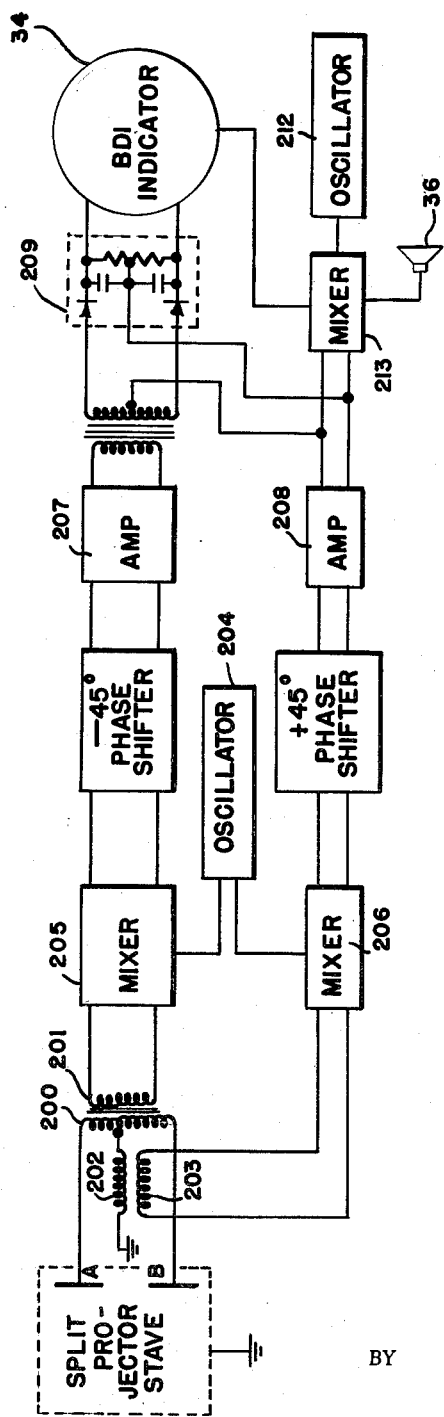
FIG. 2 is a block diagram of a receiver used in the invention.

The preferred embodiment of the invention includes search and attack portions, in which only the search portion is utilized until the target range is closed to a predetermined extent as, for example, to 1,000 yards, after which further detailed information is derived from the attack portion of the system. The search portion, however, remains continuously in operation.

Referring to the drawings, two separate transducers capable of converting electrical energy into accoustical energy and vice versa are designated 10 and 12 and are mounted one above the other on a common training shaft 14 so that they are adapted to be rotated in a plane parallel to the deck of the ship by a training motor 16 in response to a signal from a training motor control unit 18. The search transducer 10 consists of a plurality of segments as disclosed in detail in copending application Ser. No. 549,460 of Schuck, et al., filed August 14, 1944, now Patent No. 2,697,822, each of which is operated as a unit for the conversion of electrical energy into acoustical energy and vice versa. The transducer 10 is connected at suitable intervals to a search transmitter 20 through a junction box 22 containing suitable send-receive relays.

For reception, the search transducer is connected through the junction box 22 to a system which is continuously alert in all directions and which has previously been described in said Schuck et al., application Serial No. 549,460. This system comprises a scanning and beam forming rotor 24 which receives the signal coming from the transducer 10 and presents it to a brightening receiver 26 and the usual azimuth plan-position indicator (PPI) 28 on which the signal appears in form of a short brightened arc or segment on a cathode ray tube.

The information which is available on the azimuth plan-position indicator 28 shows all targets within range of the apparatus simultaneously. It is desirable, if a single target is to be examined, to provide a means to break down the information received on the search transducer so that only a particular segment of the transducer, covering for example 20° of the horizon, is utilized. For this purpose the transducer 10 is made trainable in the azimuthal plane. Certain of the segments of the search transducer are connected to a search listening lag line 30, the output of which is fed to a bearing deviation receiver 32. The lag line is so constructed that, in effect, two closely spaced transducers are formed from the elements of the search transducer 10 and the output of the lag line comprises two channels which are compared in receiver apparatus 32 in a suitable manner as for example as described in application Serial No. 549,523, of Oscar H. Schuck, filed August 15, 1944, now Patent No. 2,665,416. The output of the bearing deviation receiver 32 is utilized to brighten and deflect the trace of a second cathode ray tube 34 and to actuate a loudspeaker 36. Similarly this output is also fed to a horizontal range recorder 38 in the usual manner.

It will be recognized that the apparatus so far described is a combination of the scanning echo ranging system described in the above cited Schuck et al. application Ser. No. 549,460, and a bearing deviation indicator (BDI) with the modification that the bearing deviation indicator takes its information from certain of the elements of the common search transducer 10. Since this transducer is made trainable, it is necessary to introduce a correction factor into the display on the azimuth PPI indicator 28. The introduction of this correction factor, which serves to maintain the relative bearing 000 at the top of the screen regardless of the angle through which the search transducer is turned, will be described hereinafter under the control features of the invention.

The attack transducer 12 comprises, in the present instance, of an array of electrosonic elements which cover that portion of a cylindrical surface which is necessary to transmit and receive a sound beam from any point in a vertical plane between a forward horizontal direction, downwardly past the center line of the ship and to a line pointing about 30° rearwardly, taking into account the fact that the ship rolls and thus varies the position of the transducer with respect to a horizontal plane. For this purpose it is only necessary to fill approximately 270° of the surface of the cylinder with the electrosonic elements as indicated by the dotted line portions of 12 in FIG. 1A. In the preferred form, the attack transducer is divided into 48 staves of magnetostrictive laminations, each of which comprises a right and left element so that in effect two closely disposed partly cylindrical transducers are provided. The attack transducer must be trainable since it scans in a plane perpendicular to the deck of the ship and the plane must be brought through the target if an echo is to be received.

The attack transducer is connected through an attack junction box 50 to an attack transmitter 52 and may be actuated either manually or automatically, and at the usual varying pulsing rates. If desired the junction box may include means to actuate only certain ones of the transducer elements during transmission in order that a properly directed beam may be emitted. This is advantageous for in certain waters it has been found that echoes from the bottom are so severe as to obscure a target echo by completely overloading the receiving system so that a relatively sharp beam directed at an angle to the vertical is useful in reducing the effect of bottom reverberation.

Once a sound pulse has been emitted from the attack transducer its transducer elements are connected to the receiving position in the junction box 50 and are scanned by an angle scanning rotor 54 which may be either the capacitative or inductive type described in the above mentioned Schuck et al. application, Serial No. 549,460 or the electronic type described in the copending application of Stanley R. Rich, Serial No. 563,042, filed November 11, 1944, now Patent No. 2,703,396. In either event the information from the scanning rotor 54 is fed to a depth angle brightening receiver 56 and thence to an elevation position indicator (EPI) and to a depth recorder 60. The system which is thus provided to scan in depth is, in effect, the counterpart of the search scanning system operating now in a vertical plane instead of a horizontal plane. Sweep circuits 27, interposed in the circuit of the junction boxes, scanning rotor and the individual indicators, are provided to coordinate the integrated sonar system.

The sweep circuits 27 thus provide a beam sweep generating means for the individual cathode ray indicator, direct and control the operation of the search and angle scanning rotors, and further, key the search and attack transmitters through the junction boxes. In so doing, the entire system is regulated to provide a single coordinated system.

As above stated the elements of the attack transducer 12 are subdivided to provide right and left halves so that information from these halves may be used to actuate the bearing deviation indicator BDI receiver 32. A switch 62 having "Search" and "Attack" positions is provided which connects the BDI receiver 32 to the listening lag line 30 in one position and in its other position connects this receiver to the depth scanning portion of the system. While it is possible to utilize a direct connection type of bearing deviation indicator it is more convenient to connect the BDI receiver through rotatable scanning rotors or commutators so that the bearing deviation indicator may be connected, at the will of the operator, to any set of transducer staves so that the beam of sensitivity may be rotated by him in the vertical plane. For this purpose the system includes a commutator-type sum listening rotor 64 and a commutator-type difference listening rotor 66. These rotors 64 and 66 are each similar in construction to the commutator and lag line combination shown in FIGS. 4 and 5 of said copending application 549,460 which effectively divide the attack transducer into two units. The general principle of this type bearing deviation indicator circuit is to take the voltages from two halves of the attack transducer 12, add their values in the sum listening rotor 64 and amplify the resultant voltage in one channel; subtract their values in the difference listening rotor 66 and amplify the resultant voltage in another channel; shift the phase of each of these resultant voltages by a predetermined amount, for example, 45°, and finally to combine the outputs of the two channels in a phase sensitive rectifier to give a D.C. voltage for operation of the BDI indicator 34 in a manner to be described more fully in connection with FIG. 2. The "sum" channel may also be conveniently used to provide a voltage for brightening the spot on the indicator 34 and power for operating the range recorder 38 and speaker 36. Thus the receiver 32 performs both the functions of a BDI receiver and a listening receiver at the same time.

For purposes of a relatively long range search the frequency of operation of the search transducer 10 and its associated elements including the receiver 26 are best kept to a relatively low value, for example 26 kc. However, for the close range attack system a higher frequency with the better definition resulting therefrom is more usable so that the attack transducer and its transmitter and receiving parts are conveniently arranged to operate at a frequency of, for example, 38 kc. Since the receiver 32 must operate with either transducer its components must be selected and arranged to provide for this interchangeability.

As above noted, the bearing deviation receiver 32 is incorporated as the preferred form of listening channel receiver. There are several known devices of this class which have been used, each of which produces an output reading which is dependent on the phase of arrival of sound waves at two or more closely disposed hydrophones or at two or more parts of a single hydrophone. Whenever the phase at the two hydrophones is the same the deviation indication is zero. Since there are several possible directions in which the phase of arrival can be the same, of which one is normal to the face plane of two hydrophones, pure phase measurement alone is not relied on. Instead, a combination of phase and amplitude is measured by making the hydrophones directionally sensitive to a degree such that secondary zero indications are so small as to be negligible.

In the search channel, certain of the elements of the search transducer 10, enough to give two satisfactory overlapping beamed responses, produce signals that are ultimately fed to the receiver 32 of the "sum and difference" type modified in an important respect by the addition of a superheterodyne oscillator as indicated in the receiver block diagram FIG. 2. The usual "sum and difference" bearing deviation indicator is fed by the output of the two hydrophone halves, A and B, to the ends of a transformer primary 200 shown in FIG. 2. In one modification (parallel split), the hydrophone halves are connected so that for a signal arriving in phase the currents flowing in primary winding 200 from respective hydrophone halves A and B are 180° out of phase, and no voltage is induced in an associated secondary 201 which thus represents the "difference" channel. The "sum" channel which is energized from a transformer primary 202 connected between the halves of primary 200 and ground will contain a maximum signal for a wave train arriving in phase at the two transducer halves due to the addition of the currents originating from hydrophone halves A and B.

In general, the output from the transformer secondary 201 is the electrical difference between the voltages developed by the two effective transducer halves; while the output from the sum transformer secondary 203 is the electrical sum of the two voltages developed by the two halves. If it is assumed that the outputs from the two halves are identical in amplitude, the phase difference between the sum and difference voltages thus formed is 90°.

The signals contained in the sum and difference channels are thus 90° out of phase, and since an indication of their relative magnitudes is desired it becomes necessary to introduce a phase shift in one or the other, or both channels sufficient to bring them into phase with each other. This may be done at any point in the two channels prior to comparison, but in the present instance we prefer to lower the signal frequency by mixing the signal in each channel with the output of a local oscillator 204 in mixers 205, 206. At the same time or preferably immediately thereafter, the phase shift is introduced by shifting the difference channel —45° and the sum channel +45°. Experimental evidence has shown that phase inequality between the two amplifier channels is not serious within at least 20° of the optimum, and amplitude inequalities within ±2 db between the two channels are not disturbing. The system is thus easily manufactured and adjusted since the component specifications need not be unduly strict.

Since a single oscillator 204 serves both channels, unicontrol of the receiver and the transmitters of the systems becomes possible. The IF and subsequent filters of the receiver may remain fixed, with variations in the frequency of echo ranging operation dependent on oscillator 204.

Thus, with unicontrol the output of oscillator 204 is mixed with the output of the usual transmitting oscillators contained in units 20 and 52 in mixers so that the frequency of transmission, $F_T$, becomes:

$$F_T = F_R - F_O$$

where $F_R$ is the frequency of the master oscillator 204
$F_O$ is the frequency of the transmitter oscillator It will be seen that the IF of the receiver 32 (assuming no Doppler shift) is:

$$IF = F_T - F_R$$

or $$IF = F_O$$

both of which remain fixed even though the frequency of transmission be changed.

The phase shifted signals from 205 to 206 are amplified in separate amplifiers 207 and 208 and compared in a phase sensitive rectifier 209. The D.C. output of rectifier 209 is used to deflect the beam of the BDI indicator 34.

A part of the output of the sum channel is beat against a second oscillator 212 in a mixer 213 and operates speaker 36 and, more importantly, is used to brighten the spot of indicator 34.

It will be understood that the roll and pitch of the searching ship will introduce errors into the system indications and will move the echo-ranging beam off the line of sight to the target unless means are provided to compensate for the angular displacement of the transducers. To this end the invention includes a stable element 100 and a trunnion tilt corrector 102, shown in block form in FIGS. 1 and 3, which are incorporated in a standard two-axis stabilization system. The stable element is a conventional ordnance unit including a gyroscope rotating about a vertical axis, the gimbals of which are trainable. In the type which has been used in connection with the present invention, the frame of the gyroscope is fixed to the deck and the movements thereof in response to rolling and pitching of the ship are taken by a magnetic field arrangement which is balanced when the gyroscope frame is in the vertical position but which becomes unbalanced when a magnetic element carried by the gyroscope frame is moved out of position in response to a motion of the ship. The unbalanced signals are transmitted by a servo system to move the gimbals so as to return the gyroscope frame to the vertical position. Two outputs from the stable element provide the necessary amount of motion of the gimbals. The third output from the stable element is the amount of rotation of the gimbals about an axis perpendicular to the deck of the ship. The amount of rotation of the gimbals about the axis perpendicular to the deck of the ship corresponds to the training of the transducer about this same axis. These three outputs are fed after certain modifications to be described hereinafter to the trunnion tilt corrector wherein are established the necessary angular orders to maintain the echo-ranging beam along the line of sight to a target independent of ship's roll and pitch.

The outputs from the trunnion tilt corrector are termed "train order" and "depression order." The former is used to train the transducers about an axis perpendicular to the deck of the ship through training motor control 18, and the latter is used only for the attack system, to select by means of commutators 64 and 66, shown in block form in FIG. 1, the proper elements on the attack transducer to form a receiving beam of sensitivity at the angle of the depression order measured in a plane perpendicular to the deck from the deck to the line of sight. The beam of sensitivity from the attack transducer is thereby directed in a specific direction in space at all times, independent of the roll and pitch of the ship. It will be understood that the beam of sensitivity of the search transducer is stabilized at the same time as the beam for the attack transducer only when the two transducers are trained on the same target.

Under these circumstances the search transducer beam of sensitivity is also pointed at the same target at all times independent of roll and pitch of the ship, since the means of determining bearing for the target by the search transducer utilizes a plane perpendicular to the deck of the ship.

Referring to FIG. 1B, a cursor 104 is provided at the face of the search plan-position indicator 28 to indicate the relative bearing position of the trainable transducers. Corrections of the cursor's position is established by an azimuth handwheel 106 and by a change in the ship's course. The handwheel 106 is mechanically connected to the rotor element of a conventional differential synchro generator 108 into which the ship's course is fed on one winding (derived from a conventional synchro generator 109 which is mechanically coupled to this shaft of the gyro compass 112), and, when combined with the position of the handwheel 106, a quantity representing relative bearing of the target (relative to the ship) results in the other synchro winding of the differential generator 108. The output of the differential generator indicating relative bearing of the target is fed through a conventional servo link 111 which varies the position of cursor 104. The azimuth or bearing position of the transducers 10 and 12 also are varied in response to the movement of the azimuth handwheel 106 and change in ship heading as indicated by the movement of the gyro compass 112. Thus, this quantity, designated $B_r$, is used to position the cursor 104, and is also transmitted to the stable element where it is modified by a deck tilt corrector whose output trains the gimbals of the stable element.

In the known scanning systems in which a stationary transducer covering all or a predetermined portion of the horizon is used each transducer element is connected to a corresponding commutator element and the system is so aligned initially that when a group of elements centered at relative bearing 000 is activated by a signal from that direction a spot occurs on the indicator which is at the top of the screen. In the present system where the transducers are trainable it therefore becomes necessary to introduce a correction factor to retain the same type of indication as was obtained in the known scanning systems described above since the group of elements which were previously pointed dead ahead may now be trained to a different angle so that another group represents the forward looking sensitivity. This correction can be established by either correcting the position of the commutator physically or by shifting the phase of its output through an angle equal to the relative bearing angle. Since the latter expedient is more convenient, the electrical quantity representing $B_r$ is utilized, through a conventional servo system, to position a phase shifting transformer 110, shown in block form in FIG. 1, in the spiral sweep line between the search scanning rotor 24 and the associated indicator 28. The indication is thus corrected so that a signal always appears at its proper relative position on the screen regardless of the angle through which the transducer is trained.

The controls for the attack portion of the system are somewhat more involved and include a synchro generator 120 (see FIGS. 1 and 3), one element of which is driven by a depth handwheel 122 (which also varies the vertical angle of the attack transducer reception further by varying the angular position of the sum and difference listening commutators by way of a differential synchro 134 rotated by movement of the handwheel 122) so that the output of the synchro 120 is a function of the position of the handwheel. This output is fed to a CT synchro 125, amplified and used to drive a motor 126 which in turn drives a cursor 128 operating over the face of the elevation position indicator 58 to indicate the position of the response pattern of the depth transducers as determined by the position of the sum and difference commutators 54 and 64. There is, therefore, an essentially mechanical connection between the handwheel 122 and the cursor 128, the synchro and servo systems being introduced only for the reason that the electrical output of the synchro 120 is utilized elsewhere in the system. This electrical output is designated $E_q$ and is the depression angle between the line of sight to the target and the horizontal plane measured in a vertical plane. The electrical quantity $E_q$ is taken through another synchro-amplifier system 127 into a drive motor 130 the shaft of which is connected to and turns the rotor of a differential generator synchro 132 through an angle equal to $E_q$. One winding of this latter synchro is energized with a quantity representing level which is the necessary motion of one gimbal to keep the gyro gimbal horizontal, or the angle between the horizontal plane and the deck plane measured in a vertical plane passing through the line of sight, so that one synchro winding contains a quantity $E'_q$ which is the target depression angle corrected for the roll and pitch of the carrying ship as determined by the stable element.

Since it is necessary to indicate the true depression angle of the target on the screen of the indicator 58 the spiral sweep of this indicator is corrected to introduce a phase shift equal to the corrected target depression angle $E'_q$ (output of T.T.C.) minus the actual depression angle $E_q$. For this purpose the shaft of drive motor 130 may be continued to rotate synchro 132 and introduce angle $E_q$ into the rotor thereof. One winding of synchro 132 is energized with a quantity $E'_q$ from the T.T.C. 102 so that the other winding receives the correction quantity $E'_q - E_q$. This quantity is fed to rotate a phase shifting transformer 136 inserted in the spiral sweep for the indicator 58 through servo positioning means associated therewith.

Differential synchro 134, which is driven by the motor 130, has the angle $E_q$ introduced thereby and receives in one winding thereof the output from the stable element 100. The output of synchro 134 is then fed to the trunnion tilt corrector 102 wherein the signal is transferred to the rotors 64 and 66 to thereby vary the vertical angle of the attack transducer by varying the angular position of the sum and difference listening rotors 64 and 66.

To enhance the usefulness of the listening channels of both the search and attack portions of the system, apparatus is provided to eliminate therefrom the frequency shift caused by motion of the attacking ship through the water. As a result of this nullification of the "own Doppler" shift, any change in frequency in the received signal from the transmission frequency may be ascribed to motion of the target, and this frequency shift may be utilized in various ways to enhance the indication of the receiving and recording equipment. Various Doppler sensitive circuits have been proposed and used in connection with the BDI gear as well as with the range recorder. It is, of course, advantageous to indicate and/or record only echoes from moving targets or to enhance these indications over echoes received from stationary targets.

It is possible to introduce a correction factor for own Doppler nullification in a beamed sound system such as that represented by the listening channels of both the search and attack portions of the present invention either at the transmitter or at the receiver with equal potential effectiveness, although in the scanning portion, introduction at the receiver is less complicated.

There are available at the present time two types of own Doppler nullifiers which have been used and tested extensively. First, the reverberation controlled type described in the copending application of Leon G. S. Wood, Serial No. 547,919, now Patent No. 2,431,854, and secondly the computed correction type disclosed in the copending application of O. H. Schuck, Serial No. 509,300, now Patent No. 2,438,580.

A voltage proportional to ship's speed may be readily obtained by known apparatus operated by the ship's log. This voltage $S_0$ is fed to the stator winding of a synchro resolver 160, or wound rotor induction apparatus in which the voltage induced in the rotor is varied sinusoidally as the angular position of the rotor is changed. If this angular position is changed by an amount equal to $B_{rq}$, the relative bearing to which the transducer is trained by motor 16 a voltage equal to $S_0 \cos B_{rq}$ may be taken from the rotor. This voltage is used to correct the receiver associated with the search portion of the system, and is further applied to the stator of a second resolver 162. The rotor of resolver 162 is turned through an angle $E_q$ by motor 130, so that a voltage equal to $$S_0 \cos B_{rq} \cos E_q$$

is taken therefrom and applied to a local oscillator in the attack receiver 56 or in the attack transmitter 52. The application may be in any portion of the oscillator circuit in a manner well known in the art, for example to a reactance tube or to a capacitor in the oscillator tank circuit.

A switch 62, is used by the operator to connect the system for "search" and "attack" functions, the principal alteration being the interposition of the BDI receiver in alternate portions.

The operation of the system has been described in connection with the description of the components but is briefly restated here. Pulses of energy are transmitted from the search and attack transducers at different frequencies. The pattern of the search transducer is preferably such that the sound waves therefrom are distributed equally over the entire horizon, while the pattern of the attack transducer covers only a predetermined angle in a plane vertical with respect to the deck of a ship. As previously stated, the beam of the attack transducer may be made narrow even in this plane in order to reduce troublesome bottom echoes.

While the search transducer is made trainable by mounting it on the same rotating shaft as the attack transducer in the form shown, equally good results can be attained if the trainability is limited to the attack transducer alone. Under these circumstances the introduction of the correction factor $B_r$ into the sweep circuit of the search indicator is replaced by the correction factor $B'_r - B_r$. The search transducer is shown as trainable simply for convenience.

Received wave energy is scanned in a plane parallel to the deck of the carrying ship by the search transducer and its associated scanning receiver and all echoes are indicated as bright spots on the PPI indicator 28. If the operator so desires he can investigate any one echoing body in greater detail by using the BDI receiver 32, loudspeaker 36 and range recorder 38. For this purpose the BDI receiver is, as stated above, connected to only certain transducer elements and the transducer is made trainable so that these elements can be centered on the target in the usual manner of operation of a "searchlight" transducer. When it has been determined that an attack should be made on the echoing body under investigation and the range closed to about 1,000 yards switch 62 is thrown to the "attack" position. Thereafter information is taken from the attack transducer which operates at a higher frequency in order to avoid interference between the search and attack systems and for reasons of constructional convenience. The search system continues in operation, however, and gives target information on azimuth indicator 28.

The energy received by the attack transducer is scanned in a plane perpendicular to the deck of the carrying ship and the associated scanning receiver presents information on the depth recorder and on the EPI indicator as bright spots indicating the echoing bodies. The BDI receiver 32 now receives its signal from the attack transducer which is split into right and left segments so that the BDI indication is in a direction at right angles to the direction of scanning. This dual use of the attack transducer is highly advantageous.

Inasmuch as the carrying ship does not remain steady in the water, correction factors are introduced to compensate for the roll and pitch, as these motions affect the position of the attack transducer and would normally cause loss of the target spot during part of the time, and/or a moving indication on the screen of the associated cathode ray tube. These corrections take the form of corrections of the transducer shaft train angle, of the position of the depth listening commutators, and in the electrical signal from the depth scanning commutator. With the proper stabilization factors introduced, the indication remains stationary, and the true position of the target in the water is given to the operator.

While the present invention has been disclosed in connection with a specific apparatus, it will be appreciated that various modifications and changes therein may be made and that additions and supplements will suggest themselves to those skilled in the art.

What is claimed is:

1. In a sonar system, the combination of a pair of split projector staves for each transducer element, a sum and difference type transformer connected to said pair of staves, a first mixer channel connected to the difference secondary of said transformer, a second mixer channel connected to the sum secondary of the transformer, an oscillator feeding a fixed frequency signal in mixing relation into said channels to modify the signals from said secondaries, means shifting the phase of at least one of the mixed signals in said channels to phase identity therebetween, amplifying means for the resulting phase equalized signals, signal amplitude comparing means connected to said amplifying means, and means responsive to said amplitude comparing means for indicating the relative amplitude, whereby the difference in signals from said pair of staves provides a bearing deviation indication.

2. A system in accordance with claim 1 including means for selective scanning by the transducer in a given plane, said means comprising said pair of staves aligned in an effective plane normal to the scanning plane of said transducer.

3. The system of claim 1 wherein the phase of the difference voltage is retarded substantially forty-five degrees and the sum voltage phase is advanced substantially forty-five degrees.

4. In a sonar system the combination of means for scanning within a plane comprising a pair of transducer elements effectively disposed in a direction perpendicular to said plane for each elemental direction of scanning, a sum and difference type transformer having a pair of primary windings connected to be energized by voltages in each of said pair of elements, a secondary winding for each said primary sum and difference windings, an amplifier channel for said sum voltage, a similar amplifier channel for said difference voltage, an oscillator common to both said channels producing a fixed frequency, mixer means in each of said channels for mixing the output of said oscillator with said sum and difference voltage, phase shifting means equalizing the voltage phases in said channels, means responsive to the sum voltage amplified signals for indicating the presence of a signal representing reflection from a sonar object, and means responsive to the output of said amplifier channels for indicating the relative magnitude of the sum and difference voltages to indicate the degree of deviation of the direction of said object from the nearest elemental direction of scanning.

5. An attack sonar system comprising a directional depth transducer for depth scanning, means for continuously moving the response pattern of said second transducer to continuously scan in a plane at right angles to the surface of the water, means for utilizing said directional transducer to detect sounds only in the vicinity of specific depth angles while said transducer is also continuously scanning, and means operatively connected with said latter means for indicating the bearing deviation of the sound signals received at said specific depth angles.

6. The combination of claim 5 characterized further by respective means for varying the direction of the response patterns of said transducer without physical movement of said transducer including means for dividing said transducer into two spaced directive elements, a direction indicator device for measuring the direction of the signals received by said transducer when the directive response pattern thereof is in a fixed position comprising means for summing up the signals received by one set of spaced directive elements coupled thereto, means for subtracting the signals received by said latter spaced directive elements, means rendering the sum and difference signals in phase with each other, means comparing the amplitude of said in phase signals whereby a measure of the direction of the signals detected by the transducer is obtained.

7. An attack sonar system for installation on a moving vehicle comprising a first trainable directive azimuth transducer, a second trainable directive depth transducer, first commutator means connected to said depth transducer to effectively divide said depth transducer into two projector units and for selectively manually varying the depth angle of the response pattern of said depth transducer, compass stabilization means for maintaining the response pattern of said transducers in a fixed position relative to a target independent of the vehicle motion by varying the bearing position of said transducers relative to the center line of the said vehicle in response to a change in ship heading, means for moving said first commutator means in response to roll and pitch of said vehicle to vary the depth angle of the response pattern of said depth transducer relative to the center line of said ship to maintain the said response pattern on target irrespective of the position of said vehicle, means associated with said first commutator means for determining the depth angle of the echoes detected by the response pattern controlled by said first commutator means, second and third commutator means similar to said first commutator means associated respectively with said first and second transducers for forming respective response patterns which continuously scan the azimuthal and vertical depth planes, respective cathode ray tube plan position indicator means including respective beam sweep generating means therefor for indicating the range and position of targets respectively in the azimuthal and vertical depth planes, respective means responsive to change in ship heading and to the rolling of the ship for varying the phase of the azimuth and depth indicator beam sweep respectively to cause said indicators to accurately indicate the relative bearing and true depth angles of respective targets shown thereon.

8. The combination of claim 7 characterized further by said azimuth and depth indicators each including an index marker on the face thereof for indicating the azimuth position and the depth angle position respectively of the transducer and the response pattern controlled by said first commutator means, means for moving the index marker on the face of the azimuth indicator in response to a change in ship heading, said index marker on the face of said depth indicator movable only in response to a change in the manually positioned depth angle of the response pattern of said depth transducer.

9. An attack sonar system for installation on a moving vehicle comprising a directional depth sound transducer for depth scanning, means for continuously moving the response pattern of said transducer to continuously cause same to scan in a vertical plane, means for utilizing said transducer to also detect sounds only in the vicinity of specific depth angles while said transducer is also continuously scanning, means associated with said latter means for indicating the bearing of the sound signals received at said specific depth angles, a cathode ray tube elevation position indicator for indicating the range and depth angle relative to a horizontal line of the targets detected by said depth sound transducer, beam sweep generating means for said indicator, a phase control means for varying the phase of the output of the beam sweep generating means associated with said indicator, means for selectively varying the azimuth of the depth transducer, means for maintaining said depth transducer responsive to signals from a given depth angle relative to a horizontal reference line independent of the physical movement of the transducers, means associated with said phase control means for varying the phase of the depth indicator sweep in response to the movement of the center line of said vehicle from a horizontal plane.

10. An attack sonar system comprising a transducer trainable in a first plane for receiving sound energy from a target, said trainable transducer including a plurality of transducer elements arcuately disposed with respect to each other and said first plane, each of said transducer elements being divided into two sections symmetrically disposed about a second plane perpendicular to said first plane, a scanning commutator connected to said transducer elements to produce a directional characteristic shiftable in said second plane, a brightening receiver connected to said scanning commutator, a first cathode ray indicator having a brightening grid connected to said brightening receiver and a deflectable electron beam, sweep means connected to said scanning commutator and to said first cathode ray tube indicator to shift the direction characteristic of said transducer and the direction of deflection of said electron beam in synchronism with each other, second commutator means connected to said trainable transducer to provide a selectable directional characteristic, an adjustable cursor on said cathode ray tube, means connected to said second commutator means for providing a first output proportional to the sum of the response of the connected transducer halves and a second output proportional to the difference between the response of the connected transducer halves, phase and amplitude comparison means connected to said first and second outputs to produce a deviation voltage varying in polarity and magnitude with the direction and deviation of the target from said second plane, a second cathode ray indicator including means for deflecting the electron beam thereof, and means connecting said phase and amplitude comparison means to said means for deflecting the electron beam of said second cathode ray indicator, whereby to locate the target in two intersecting perpendicular planes.

No references cited.

CHESTER L. JUSTUS, *Primary Examiner.*

NORMAN H. EVANS, JACK H. LINSCOTT,
*Examiners.*